May 20, 1969     E. L. LUSTENADER     3,444,924
HEAT EXCHANGER
Filed Nov. 25, 1966
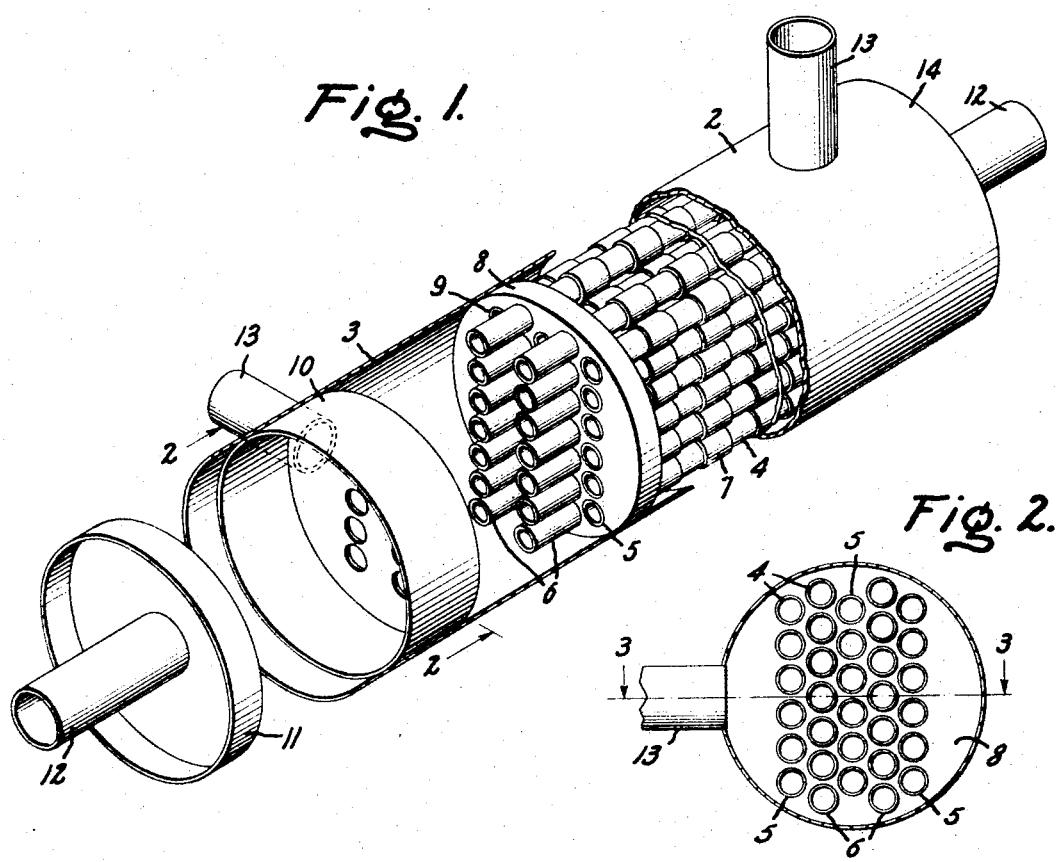
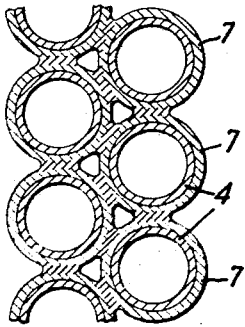
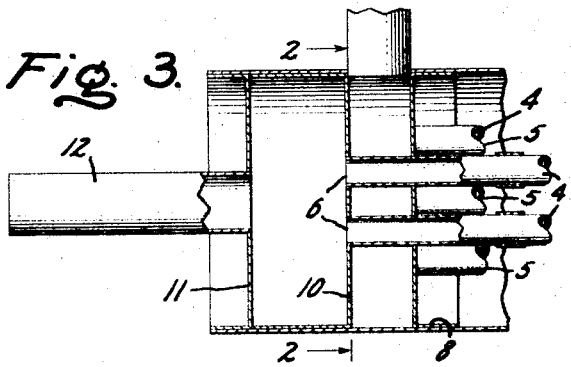
Inventor:
Edward L. Lustenader,
by *Maurice Mitchell*
His Attorney.

United States Patent Office 3,444,924
Patented May 20, 1969

3,444,924
HEAT EXCHANGER
Edward L. Lustenader, Scotia, N.Y., assignor to General Electric Company, a corporation of New York
Filed Nov. 25, 1966, Ser. No. 596,986
Int. Cl. F28d 7/00
U.S. Cl. 165—164        5 Claims

ABSTRACT OF THE DISCLOSURE

A tube heat exchanger having thin tubes made of low thermal conductivity material lying adjacent each other and each tube has bands of highly thermal conductive material attached around its circumference to pass heat from tube to tube.

---

My invention relates to a heat exchanger and particularly to a heat exchanger for cooling cryogenic fluids.

Until this time, most of the heat exchangers for cryogenic fluids have been of the long axial type. They have utilized few tubes for carrying the fluids and the length of these tubes has been many times the diameter. The tubes have been long because the temperature drop within a tube might be on the order of 200 or more degrees Fahrenheit and must heat was lost by axial conduction through the tube from one end to the other. By making the metal tubes relatively long in comparison to their diameter, less heat was lost by axial conduction. That is to say, in long tubes heat transfer down the tubes is relatively small in comparison to the heat transfer through the thin walls of the tubes. Thus, the conductive heat loss along the axis of the tubes is small compared to the heat transfer through the walls of the tube to the medium outside.

It is apparent that a method or apparatus which will lessen longitudinal heat conduction and foster lateral heat conduction will result in an improved apparatus.

It is an object of my invention to construct a heat exchanger apparatus having a high efficiency of heat transfer through the apparatus.

It is another object of my invention to provide a heat transfer apparatus which is compact, uses less material and is light in weight.

It is another object of my invention to provide cryogenic heat transfer apparatus having a limited fluid pressure drop therethrough.

My invention is particularly adapted for heat transfer in cryogenic systems, operates on the counterflow principle, and has small tubes stacked in layers with each layer resting on one below. Cooler fluid flows through alternate layers and warmer fluid flows through the other layers in counter flow. Thermal bonding between rows of tubes is accomplished by bands of highly conductive material forming striations down the tube. Each band is thermally connected to its tube by plating, brazing or soldering, for example, in order to have high heat transfer from the tube to the band and vice versa. The bands on each layer of tubes are attached to the corresponding bands on the next layer to form a heat conductive connection between the bands of adjacent layers of tubes. Heat is conducted from a warm layer up through the heat conductive bands and bonding material to the cooler heat conductive bands and then to the cooler tubes where the heat is carried off by the cooling fluid. The fluids are conducted to one layer of tubes at one end of the exchanger and to the next layer of tubes at the other end by appropriate headers.

FIGURE 1 shows a perspective view of my heat transfer apparatus.

FIGURE 2 is a section taken on line 2—2 in FIGURES 1 and 3.

FIGURE 3 shows a cutaway view of my header taken along line 3—3 of FIGURE 2.

FIGURE 4 shows details of the bonding of the conductive band material.

In FIGURE 1, I have shown a perspective view of one embodiment of my plated tube heat exchanger. My heat exchanger 1 is shown partly disassembled having a pair 2, 3 of cylindrical shields arranged around the transfer tubes 4 of the exchanger. These shields form no part of my invention and this particular embodiment is made in this way for ease of carrying and maintaining. In this embodiment, the space between the inner tubes 4 and the outer cylindrical shields 2, 3 are evacuated to avoid heat transfer by conduction. The outer cylindrical shields 2, 3 are of a material having low heat conduction characteristics such as stainless steel. The small inner tubes 4 are the principal working elements of my apparatus. These tubes are of small diameter in relation to their length, are thin walled and made of a relatively nonconducting material such as stainless steel. These tubes are arranged in layers 5, 6 and the layers are mounted one over the other. As shown in the embodiment of FIGURE 1, the outer layer 5 has six tubes mounted side by side. The layer 6 next to it has seven tubes with each tube fitting snugly into the depression formed by the curvature of adjacent tubes. The next layer has six tubes and so on. Attached to each small tube is a series of very thin conductive bands 7 extending around each tube and forming striations down the axis of the tube. The bands of adjacent tubes lie next to each other and are attached to each other along their length. At each end the tubes fit into a plate 8, preferably of stainless steel and having holes 9 in it to receive the tubes. The tubes are fastened in the stainless steel plate, alternate layers 6 of tubes extending beyond the stainless steel plate 8 and into the bottom of cup-shaped member 10 shown in FIGURES 1 and 3. The end of cup-shaped member 10 is sealed by disk shaped member 11 having a tube 12 mounted on it so that when the parts are fitted together and brazed or welded, fluid may flow through the heat exchanger from one end to the other. For maximum heat transfer the fluid to be cooled flows through layer 6 in one direction while the coolant flows through adjacent tubes 5 in the opposite direction in counterflow. One current will flow through the inlet tube 12, disk shaped member 11, tube layers 6 which passes through cup-shaped member 10, plate 8 and out the other end of the heat exchanger through a similar header having similar members in a reverse order. A second flow (counterflow) passes fluid through a lateral tube 13 into the space formed by the cylinder member, the bottom of the cup-shaped member, and the plate and then through the remaining layers 5, into a similar path at the other end to pass fluid out of the heat exchanger through the lateral tube 13 in header 14 at the other end.

The cross-sectional view of FIGURE 2 shows the arrangement of tubes inside of the outer cylinder. The tubes are in layers 5, 6 and are nested one into the other for space saving and maximum lateral heat transfer.

Tubes 4 are made of very thin walled nonconductive material. Thermal conduction radially or laterally through the tubes is many times that along the length of the tubes since the lateral surface area of each tube is many times the surface area of a cross section of the tube.

When the elements of header 14 and tubes 4 shown in FIGURE 1 are assembled they appear as shown in the cutaway view of FIGURE 3. The longer layer 6 extends into the cup member 10 while the shorter layer 5 extends only through the plate 8. This particular form of header is not critical to my invention and is merely one convenient apparatus to allow counterflow.

FIGURE 4 shows the details of the bonding of the tubes of my heat exchanger. This bonding may be accomplished in any one of several ways so long as the heat transfer through the connection is high. One way is to place very thin sleeves of a highly conductive material such as silver onto the very thin tubes at spaced intervals and braze the sleeves to the tube. Then later when these tubes are assembled together the brazed materials are reheated and brazed to each other to form a connection having high thermal conductivity.

A preferred way of accomplishing this result (FIGURE 4) is to clean the bare thin walls 4 of stainless steel tubing and apply a "stop off" material onto the outer surface. This "stop off" material, such as varnish, is selectively removed in circumferential bands and the tube then plated with a very thin thickness of a material, such as silver, copper or some other material which brazes easily and is highly conductive. Following the plating process, the stop off material is removed and the tubes oxidized to avoid further flow of silver plating during the final exchanger assembly. The tubes are assembled and the conductive bands 7 touch adjacent bands. The tubes are then heated until the conductive elements braze to each other to form a path of high heat conductivity.

The tubes when finally assembled as shown in FIGURES 1, 2 and 3, form a lightweight compacted mass which allows heat conduction laterally at a high rate but longitudinal heat flow along the length of the tubes is at a very low rate. Heat flows at a higher rate in a lateral direction at the point of contact of the highly conductive silver elements to each other because the low thermal conducting tube is very thin thus giving a small path for heat flow but heat flows readily through the tube walls to the contacting silver bands of lower temperature which are brazed together to form a highly conductive heat pathway from tube to tube. The spaces between the silver elements are approximately equal to the width of the silver elements 7 (FIGURE 1) so that the tubes and silver elements form a striated arrangement with the striations being of about equal longitudinal width to the spacings. This arrangement has been found to give a very satisfactory result although the spacing between the bands may be up to twice the band width with some gain of heat exchanger qualities compared to weight and tube length.

By this means a cooling fluid may be passed in one direction through alternate layers of tubes and the fluid to be cooled flows in the opposite direction through the other tubes. Then a maximum heat transfer occurs between the cooler liquid and the liquid to be cooled as heat will flow from the liquid to be cooled through the thin tube wall to the highly conductive (material) and onto the cooling liquid. Silver, copper or some other material which will plate, is conductive and will readily braze can be used for bands. Since the tube wall is very thin, heat tends to flow in a lateral direction through the tube wall and since the distance between striations is many multiples of the tube wall thickness, heat is diverted from the longitudinal direction to flow through the very thin heat walls. As pointed out above, in this embodiment the outer cylindrical walls are made of a non-heat conductive material having low heat conducting properties such as stainless steel number 347. Since the space between these walls 2 and the smaller tubes 4 is evacuated, little heat is transferred from the stainless steel walls to the inner tubes by heat conduction.

Some advantages of this form of cryogenic heat exchanger are: it is light in weight and tubes are close together for easy assembly and high heat transfer. Further, because of the shortness of the small tubes, the fluid pressure drop across them is small.

The foregoing is a description of an illustrative embodiment of the invention and it is applicant's intention in the appended claims to cover all forms which fall within the scope of the invention.

What I claim as new and desire to secure by Letters Patent of the United States is:

1. A heat exchanger for transferring heat between two counterflowing streams comprising
   a plurality of longitudinally continuous thin-walled metal tubes, each formed of a low thermal conductivity material, one group of said tubes receiving one of said streams and another group of said tubes receiving the other of said streams,
   each of said tubes having a plurality of thin bands of high thermal conductivity material substantially encompassing each of said tubes and secured thereto in good thermal conductive relationship, each of said bands having a longitudinal extent and being spaced apart longitudinally from an adjaecnt band on a tube by a distance which is large in relation to the thickness of the walls of said tubes,
   said tubes being mounted close to one another with their axes parallel and each band of one of said tubes contacting respective bands of other adjacent tubes over a substantial extent of the external surfaces thereof to provide a good thermal conductive path therebetween,
   whereby the conduction of heat from one tube to the other through said bands is facilitated and conduction of heat longitudinally in said tubes is inhibited by the low thermal conductivity paths between adjacent bands in said tubes.

2. The combination of claim 1 in which is provided means at each end of said plurality of tubes for connecting each one of said streams to a respective group of tubes including a pair of longitudinally spaced tube plates at each end of said groups of tubes, one of said pair of plates having a plurality of apertures each registering with and secured to a respective tube, the tubes of one of said groups extending beyond the ends of the tubes of the other group, the other of said pair of plates having a plurality of apertures, each registering with and secured to a respective tube of said one group of tubes, a first enclosure means including said pair of plates for providing a header for said other group of tubes, a second enclosure means including said other plate for providing a header for said one group of tubes.

3. The combination of claim 1 in which the tubes of said one group are interleaved with the tubes of said other group.

4. The combination of claim 1 in which the bands of said tubes lying in the same axial location are brazed together to provide a good thermal conductive path therebetween.

5. The combination of claim 1 in which each of said tubes are provided with a large number of bands to provide minimal thermal impedance between corresponding bands of the tubes of each group while providing a large thermal impedance from one end of said tubes to the other end thereof.

References Cited

UNITED STATES PATENTS

| 2,139,367 | 12/1938 | Kearney | 165—149 |
| 2,241,209 | 5/1941 | Lea | 165—69 |
| 2,443,295 | 6/1948 | Bisch | 165—164 X |
| 2,610,832 | 9/1952 | Holmes et al. | 165—160 X |
| 2,621,903 | 12/1952 | Cohler | 165—164 X |

ROBERT A. O'LEARY, *Primary Examiner.*

THEOPHIL W. STREULE, *Assistant Examiner.*

U.S. Cl. X.R.

165—69